Patented Aug. 15, 1939

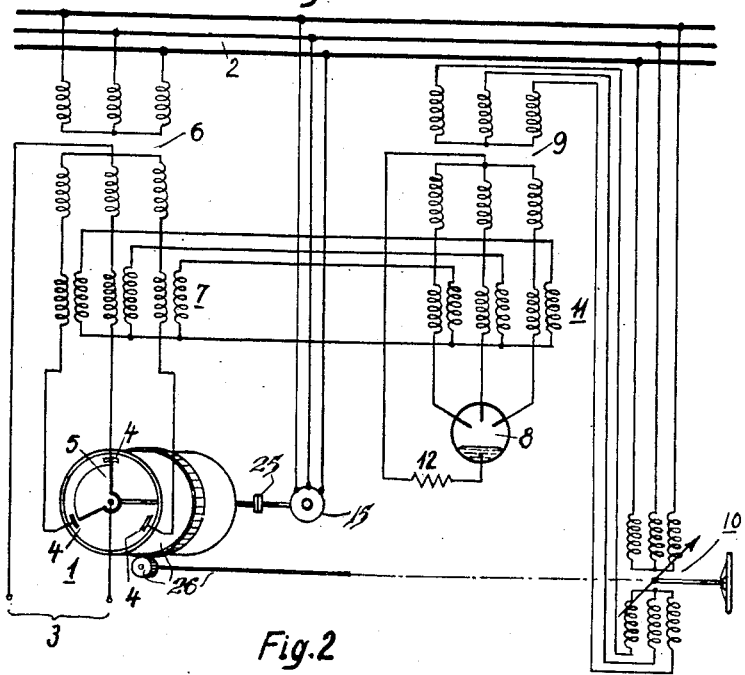
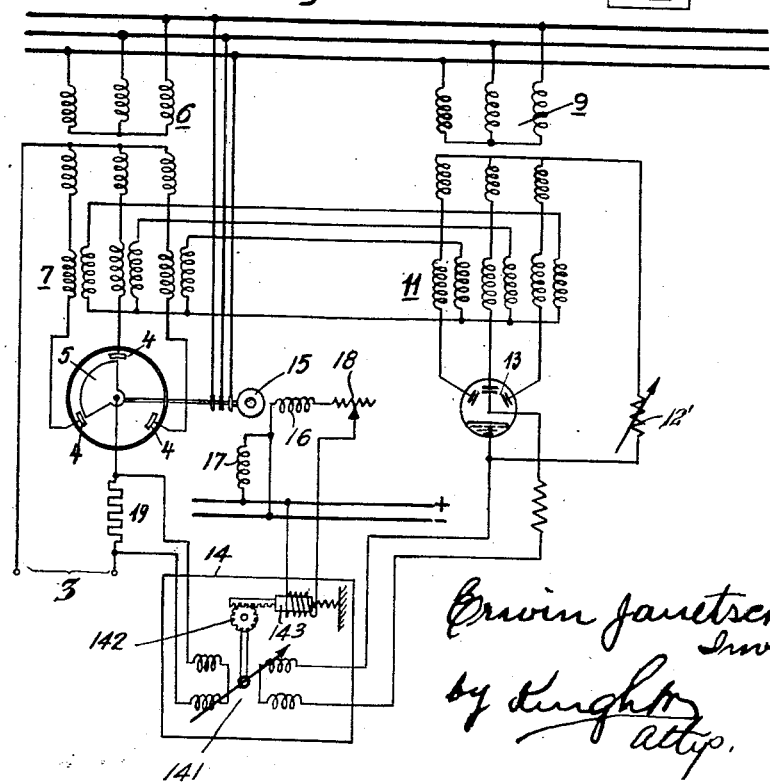

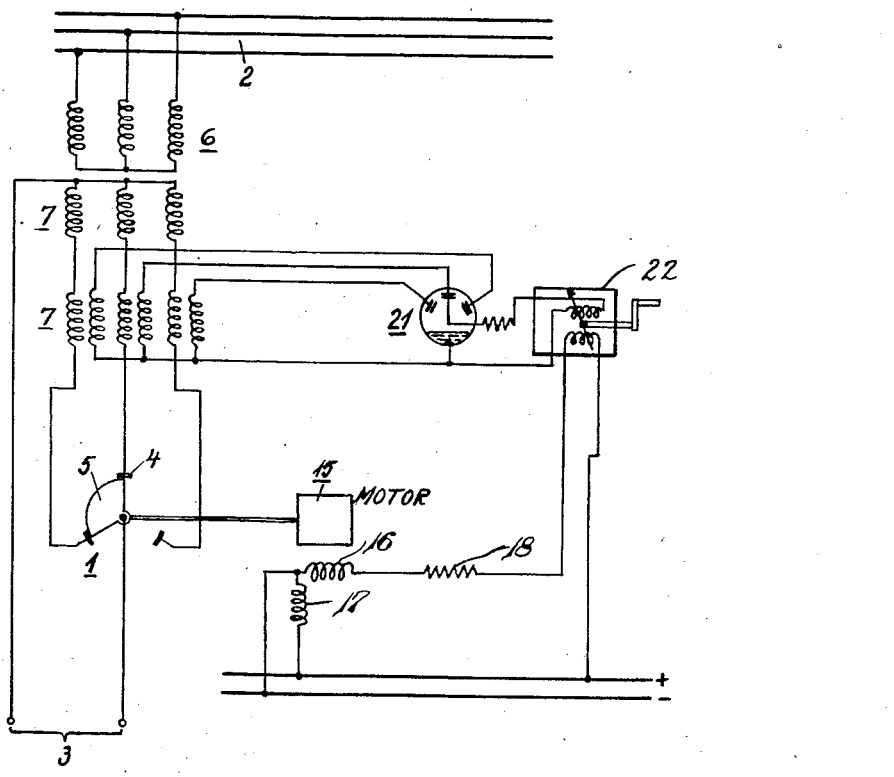

2,169,560

UNITED STATES PATENT OFFICE 2,169,560

DEVICE FOR THE CONVERSION OF ELECTRIC CURRENTS OR POTENTIALS BY MEANS OF PERIODICALLY ACTUATED SWITCHING CONTACTS

Erwin Janetschke, Berlin-Charlottenburg, Germany, assignor to Siemens-Schuckertwerke Aktiengesellschaft, Berlin-Siemensstadt, Germany, a corporation of Germany Application February 20, 1937, Serial No. 126,892
In Germany February 21, 1936

22 Claims. (Cl. 175—364)

This invention relates to improvements in devices for the conversion of electric currents or potentials by means of periodically actuated switching contacts, for instance to devices for rectifying alternating current, for converting direct current into alternating current or for converting alternating current of one frequency into alternating current of a different frequency. With such converter devices the commutation process and, in particular, the interruption of the current causes considerable difficulties. These difficulties arise from the fact that it is hardly possible to interrupt the current circuit always exactly at the instant of the zero current passage, and that the space arising between the contacts when just separated cannot always be increased with sufficient rapidity to prevent a flashing over by the recurrent potential between the contacts.

According to the invention the commutation process is improved by the following arrangement. The primary winding of a transformer is connected in series with the switching contacts of the converting device. The inductance of this transformer is controlled by varying the resistance of its secondary circuit in synchronism with the movement of the switching contacts, in particular by alternately shunting and interrupting the secondary circuit, preferably in such a manner that the inductance increases shortly before the interruption of the current. By means of the invention it is made possible that during the commutation process, only a very small potential is supplied to the switching contacts or that the current at the instant of the interruption is small enough to avoid with certainty the formation of an arc. This result is effected by the sudden large increase in the aforementioned inductance connected in series with the switching contacts. The invention further makes it possible to vary, within any desired limits, the period of time during which the potential on the contacts is reduced both with respect to its amount as also with respect to its location within the period of the switching movement. This advantage is especially important for the adaptation of the commutation process to fluctuations of the load or to changes in the direction of the power transmission or exchange. With multiple phase connections either a multiple phase transformer may be used or a plurality of single phase transformers with separate magnetic circuits. The latter will in many cases be advisable in order to prevent mutual influencing of the different phases.

During the operation of converter devices having mechanically actuated contacts, it is sometimes necessary to respond to variations of the load conditions or of the direction of power transmission by varying the phase position of the opening and of the closing of the contacts with respect to the potential curve of the alternating current network or the like connected with the converter device. In order that with such variations of the contact movement, the device may always operate under the most favourable commutation conditions it is advisable to make the device which periodically controls the resistance of the secondary circuit of the transformer, so dependent upon the phase position of the contact movement that the phase position of the periodic variations of the aforementioned resistance is also varied correspondingly. Even without the phase position of the contact movement being varied, load variations or other variations of working magnitudes of the converter device may require a variation of the phase position of the periodic fluctuations of the inductance connected in series with the contacts. In such cases it is advantageous that the device controlling the phase position of the inductance fluctuations is also automatically regulated depending upon these working magnitudes.

Discharge gaps, and in particular those in the form of arc discharges, are preferably employed as actuating members for varying the resistance of the secondary transformer circuit. Controlled as well as uncontrolled discharge gaps may be used for this purpose. In some cases it is possible to use the potential induced in the secondary winding of the transformer itself as the anode potential for the discharge gaps. Separate sources of alternating potential may, however, also be provided for supplying the anode potential. In this case the discharge in the discharge gaps is entirely independent of the amounts and of the phase position of the potentials induced in the secondary winding of the transformer.

The switching operations necessary for varying the secondary resistance of the transformer may also be carried out by mechanically operated auxiliary contacts. These auxiliary contacts may either be actuated by a separate driving motor or by the same motor which actuates the main contacts. A variation of the phase position of the periodic operation of the auxiliary contacts as compared with that of the main contacts may, for example, be effected by using synchronous driving motors which have a plurality of field windings located in different axes, so that the axis of the resulting excitation can be shifted as desired, by supplying the individual field windings with variable currents. If a common motor is provided for driving the main and the auxiliary contacts, mechanical means for shifting or displacing of the corresponding contact driving members with respect to each other must be provided.

The drawings show three different embodiments of the invention in diagrammatic form.

Fig. 1 shows an arrangement having an uncontrolled discharging vessel for varying the inductance series-connected with the mechanical switching device.

Fig. 2 shows another converter provided with a controlled discharge device, and

Fig. 3 shows a simplified arrangement.

In Figure 1 a periodically operated switching contact apparatus is indicated at 1 which permits the exchange of power between a three phase current network 2 and a direct current network 3 or vice versa. It is assumed that the contact arrangement 1 consists of three stationary contacts 4, arranged equally spaced on a circle, and one rotating contact 5. The rotating contact connects one pole of the direct current line with one, or during the commutation period with two, of the stationary contacts 4. 15 designates a synchronous motor connected with the network 2. The shaft of the motor is coupled by a coupling 25 with the rotation axis of the contact 5. The contact, therefore, is driven in synchronism with the current to be converted.

6 designates a main transformer connected with the network 2. Between this main transformer and the stationary contacts 4 are connected the primary windings of a transformer 7. The resistance of the secondary circuit of this transformer 7 is to be varied periodically in synchronism with the movement of the contact 5. To this end there is provided an uncontrolled triple-anode discharge vessel 8, the anode potentials of which are supplied by a transformer 9 from the alternating current mains 2 through a phase shifting transformer 10. By means of the phase shifting transformer 10 the phase position of the anode potentials supplied to the discharge vessel 8 and thus the phase position of the ignition or of the quenching of the discharge in the vessel 8 with reference to the potentials of the alternating current mains 2 may be regulated as desired. As long as one of the three discharge gaps is in action, it closes a circuit containing the winding of the transformer 11 connected in series with that gap, the transformer 9 and an external resistance 12. The other windings of transformer 11 are connected with the secondary windings of transformer 7. Therefore the action of closing one of the circuits 9, 12, 8, 11 is practically the same as if a resistance, the amount of which was calculated from the resistance 12 and the transmission ratio of the transformer 11 were connected directly to the corresponding secondary winding of the transformer 7. Thus the inductances of the primary windings of the transformer 7 are periodically increased or diminished in cyclic sequence by the cyclic ignition and quenching of the individual discharge gaps of the discharge vessel 8. The effectiveness of the series transformer 7 is particularly great when its core is made of magnetic material having a high initial permeability and low coercive force, for example, of magnetic material known as Permalloy.

In the example shown it is assumed that the stationary contacts 4 can be shifted around the axis of rotation of the contact 5 in order to vary the phase position of the opening and closing of the contacts. As mentioned above, such a shifting of the phase position must be followed by a corresponding shifting of the phase position of the inductance variations in the primary winding of the transformer 7. For this purpose the induction regulator 10 is mechanically coupled with the stationary contacts 4 by gears 26 which ensure a simultaneous adjustment and a definite relationship between the positions of the two regulating members.

Figure 2 shows a converter device similar to that of Figure 1, in which however, a controlled discharge gap arrangement 13 is used. The phase position of the anode potentials for this discharge gap arrangement need not be variable, but if desired additional use may be made of this possibility of regulation. In the example shown the control of the phase position of the periodic inductance variations of the primary winding of the transformer 7 is effected simply by shifting the ignition impulses which are supplied to the control electrodes of the discharge gap arrangement 13. The ignition impulses are delivered by a source of control potential 14, which includes a device for shifting the phase of the control potential as described later. The stationary contacts 4 of the contact apparatus in this case are not shiftable. In order to be able to shift the phase position of the contact movement the synchronous driving motor 15 of the movable contact 5 is provided with two field windings 16 and 17 the axes of which are displaced by 90° electrically with respect to each other. By varying a regulating resistance 18 the synchronous position of the rotor of the synchronous motor 15 is varied. The circuit including the field winding 16 and the resistance 18 is connected with the source 14 of the ignition potential so that a regulation of resistance 18 also acts on the phase position of the ignition potentials of the discharge vessel 13. In order that the phase position of the control potentials of the discharge vessel may be influenced also by the load in circuit 3 of the converter device a resistance 19 is connected in one of the direct current lines of circuit 3 and the potential drop across this resistance is applied to the control apparatus 14.

The apparatus 14 contains a phase shifter 141 connected between the leads coming from resistor 19 and the leads furnishing the control voltage to the discharge vessel 13. The adjustable element of the phase shifter is connected with a magnetic actuating device 143 through a mechanism 142. The operating coil of the magnetic device 143 is connected in the energizing circuit of field windings 15 and 17 so that an adjustment of the synchronous position of the motor 15 by varying resistance 18 also effects a corresponding change in the phase position of the control voltage furnished from the phase shifter 141 to the vessel 13.

Similar to the example shown in Figure 1 a resistance 12' is connected in the direct current circuit of the discharge gap arrangement. This resistance is however variable in such a manner that the current flowing through it is dependent upon the degree of modulation of the current converter, as otherwise a variation of the phase position of the inductance fluctuations in the transformer 7 would be accompanied by a variation in the value of the minimum inductance. The resistance 12' may, for example, consist of a shunt direct current machine which is loaded by a constant moment. In some cases the frictional moment of the machine is sufficient to obtain a current which is sufficiently constant.

Figure 3 shows a simplified circuit arrangement as compared with Figures 1 and 2. The anode potentials for the controlled current rectifier 21 used in this example are not taken from a separate source of alternating potential but the anode circuits are connected directly to the secondary windings of the transformer 7. The individual secondary windings are thus short-circuited directly through the corresponding discharge gaps when the latter ignite. A control apparatus 22 of any desired construction serves for adjusting and shifting the time of ignitions of the discharge gaps. This control apparatus may be adjusted either optionally by hand or in dependence upon certain working values of the converter device. In the embodiment shown, the adjustment is made dependent upon the phase adjustment of the movable contact 5 of the contact arrangement 1. For this purpose, the phase shifting means of apparatus 22 are connected with the field circuit 16, 13 of the bi-axially excited synchronous motor 15 driving the contact 5. Therefore any variation of the phase position of contact 5 by adjusting resistance 18 varies simultaneously the phase of the ignition impulses delivered by apparatus 22.

While the drawings show switching apparatus with rotating contacts, it is to be understood that other kinds of mechanical contact interrupters or commutators may also be used.

I claim as my invention:

1. A current or potential converting device for transferring energy between two electric circuits of different current or potential character, comprising a mechanical switching device, a transformer arrangement having its primary windings series connected with said switching device, said series connection being disposed to connect said two circuits, means for periodically actuating said switching device in synchronism with the current to be interrupted by said device, a biasing circuit connected with the secondary windings of said transformer arrangement, and means connected in said biasing circuit for periodically varying the resistance of said biasing circuit in synchronism with said switching device in order to increase the inductance of said primary windings at the opening periods of said device.

2. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, a biasing circuit connected with the secondary winding of said transformer and means connected in said biasing circuit for alternately closing and opening this circuit synchronously with said switching device and disposed to increase the inductance of said primary winding during the opening period and to decrease it during the closing period of said switching device.

3. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, a biasing circuit connected with the secondary winding of said transformer and an electric valve arrangement connected in said biasing circuit, said arrangement being designed for periodically varying the resistance of said biasing circuit so as to increase the inductance of said transformer at the opening time of said device.

4. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, and a discharge gap arrangement disposed in a circuit electrically connected with the secondary winding of said transformer, said arrangement being designed to periodically vary the resistance of said last-mentioned circuit dependent upon the conductive and non-conductive periods of said discharge gap arrangement in order to increase the inductance of said transformer at the opening time of said device.

5. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, a controlled discharge vessel having its anode circuit electrically coupled with the secondary windings of said transformer, and adjustable means for controlling the discharge of said discharge vessel so as to periodically vary the inductance of said transformer in synchronism with the switching operations of said device.

6. A multiphase current or potential converting device for transferring energy between two electric circuits of different current or potential curves, comprising a mechanical commutating arrangement having a switching device disposed in each connecting phase between said two circuits, means for actuating said switching devices in synchronism with the current to be interrupted so as to open each switching device at a time near the zero value of the current to be interrupted, a set of transformers having each of its primary windings series connected with one of said switching devices and a secondary winding associated with each of said primary windings, and a multiphase discharge gap circuit connected with said secondary windings and having a discharge gap disposed for each of said secondary windings, said discharge gap circuit being designed to periodically vary the resistance of said multiphase circuit containing said secondary windings so as to periodically increase the inductivity of each of said primary windings at the time of the commutation period of the switching device connected with said primary winding.

7. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, and an arc discharge gap arrangement having its discharge circuits coupled with the secondary windings of said transformer, a source of alternating potential connected to the discharge gaps of said arrangement, said potential havng the same frequency as that of the current to be interrupted by said device, and means for varying the phase position of said alternating potential in order to adjust the ignition moments of said discharge gaps with respect to the phase position of said switching device.

8. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, means connected with the secondary windings of said transformer for varying the inductance of said transformer in synchronism with said switching device, and adjusting means for shifting the phase position of said inductance variation, said adjusting means being operatively coupled with one of said two circuits so as to effect said phase adjustment in response to load conditions of said converting device.

9. A multiphase current or potential converter for transferring energy between two electric circuits of different characteristics, comprising a switching device disposed in each of the connecting phases between said two circuits, means for actuating said switching devices in synchronism with the current to be switched, variable means for adjusting the phase position of said switches, a transformer arrangement having its primary winding series connected with said switches, a multiphase discharge gap arrangement coupled with the secondary windings of said transformer and having a discharge gap disposed for each of said secondary windings so as to periodically vary the resistance connected to each secondary winding in correspondence with the conductive and non-conductive periods of said discharge gap, said arrangement comprising variable means for adjusting the phase position of said periods, and an operative connection between said adjusting means of said switches and said adjusting means of said discharge gap arrangement, said connection being designed to ensure a simultaneous actuation of said two means.

10. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, a grid controlled discharge vessel arrangement having the anode circuit coupled with the secondary windings of said transformer so as to derive the anode voltage from said secondary windings, and variable controlling means connected in the grid circuit of said arrangement for varying the phase position of the conductive periods of said arrangement.

11. A multiphase current or potential converting device for transferring energy between two electric circuits of different current or potential curves, comprising a mechanical commutating arrangement having a switching device disposed in each connecting phase between said two circuits, means for actuating said switching devices in synchronism with the current to be interrupted so as to open each switching device at a time near the zero value of the current to be interrupted, a set of transformers having each of its primary windings series connected with one of said switching devices and a secondary winding associated with each of said primary windings, a multiphase discharge gap arrangement having a grid controlled discharge gap disposed for each of said phases and connected to one of said secondary windings, a source of alternating voltage connected to the anode circuit of said discharge gaps, said source having the same frequency as the current to be switched and a definitely adjusted phase position, and means connected in the grid circuit of said discharge gaps for controlling the grid voltage in order to timely adjust the active periods of said gaps with respect to the opening moments of said switching devices.

12. A multiphase current or potential converting device for transferring energy between two electric circuits of different current or potential curves, comprising a mechanical commutating arrangement having a switching device disposed in each connecting phase between said two circuits, means for actuating said switching devices in synchronism with the current to be interrupted so as to open each switching device at a time near the zero value of the current to be interrupted, a set of transformers having each of its primary windings series connected with one of said switching devices and a secondary winding associated with each of said primary windings, a multiphase discharge gap arrangement having a grid controlled discharge gap allotted to each of said phases and coupled with one of said secondary windings, said arrangement being designed to periodically vary the inductance of said transformers by varying the resistance of their secondary circuits, a control circuit connected to the grids of said arrangement and designed to periodically vary the controlling grid potential in synchronism with the current to be interrupted by said switching devices, variable means in said control circuit for shifting the phase position of said control potential, and an operative coupling of said variable means with one of the two circuits connected with each other by said converting device, whereby said variable means are automatically adjusted in response to at least one working value of said converting device.

13. A current or potential converting device for transferring energy between two electric circuits of different current or potential character, comprising a mechanical switching device, a transformer having its primary windings series connected with said switching device, said series connection being disposed to connect said two circuits, means for periodically actuating said switching device in synchronism with the current to be interrupted by said device, an arrangement of grid controlled arc discharge gaps having its anode circuits coupled with said secondary windings so as to periodically vary the resistance of the circuits of said secondary windings, a control circuit connected to the grids of said arrangement and including a source of a control voltage having the same frequency as the current to be interrupted by said switching device, phase shifting means connected with said control circuit for adjusting the phase position of said control voltage in order to timely vary the ignition moments of said discharge gaps with respect to the period of the current to be interrupted, means for adjusting the phase position of said switching device with respect to the period of the current to be interrupted, and electric connecting means for coupling said phase shifting means of said control circuit with said adjusting means of said switching device and with one of said two circuits connected by said converting device, whereby the phase position of said grid control voltage is automatically adjusted in dependency upon the phase adjustment and in response to load fluctuations of said switching device.

14. A current or potential converting system for transferring energy between two electric circuits of different current or potential characteristics, comprising a mechanical switching device having a contact interrupter disposed in each phase branch connecting said two circuits and means for periodically operating said interrupters in synchronism with the current to be interrupted, a transformer set having each of its primary windings series connected with one of said interrupters, a second transformer set having each of its primary windings connected with one individual secondary winding of the first-mentioned transformer set, and a discharge gap arrangement having its discharge circuits connected with the secondary windings of said second-mentioned transformer set and being designed to periodically open and close said discharge circuits in synchronism with the current to be interrupted by said switching device, whereby the inductances of said connecting branches are periodically increased at the time of the opening operation of the interrupter disposed in said branch.

15. A current or potential converting system for transferring energy between two electric circuits of different current or potential characteristics, comprising a mechanical switching device having a contact interrupter disposed in each phase branch connecting said two circuits and means for periodically operating said interrupters in synchronism with the current to be interrupted, a transformer set having each of its primary windings series connected with one of said interrupters, a rectifying arrangement of grid controlled discharge gaps having each of its discharge gaps disposed for one of said interrupters and the alternating current branch of said gap coupled with one of the secondary windings of said transformer, controlling means connected with the grid circuit of said arrangement for adjusting the phase position of the conductive periods of said discharge gaps with respect to the phase position of said interrupters, and a variable resistor in the direct current circuit of said rectifying arrangement designed to vary its resistance so as to diminish the dependency of the current flowing in direct current circuit upon the degree of modulation of said discharge gap.

16. In combination with a converting system according to claim 15, said variable resistor consisting of a direct current shunt motor loaded with a constant torque.

17. A current or potential converting device for transferring energy between two electric circuits of different current or potential character, comprising a mechanical switching device, a transformer arrangement having its primary windings series connected with said switching device, said series connection being disposed to connect said two circuits, means for periodically actuating said switching device in synchronism with the current to be interrupted by said device, a biasing circuit connected with the secondary windings of said transformer arrangement and a second mechanical switching device connected in said biasing circuit so as to alternately close and open this circuit synchronously with said first-mentioned switching device in order to periodically increase the inductance of said primary windings at the beginning of the opening periods of said first-mentioned switching device.

18. A current or potential converting device for transferring energy between two electric circuits of different current or potential character, comprising a mechanical switching device, a transformer having its primary windings series connected with said switching device, said series connection being disposed to connect said two circuit, means for periodically actuating said switching device in synchronism with the current to be interrupted by said device, a second mechanical switching device connected in a circuit coupled with the secondary windings of said transformer so as to alternately close and open this circuit synchronously with said first-mentioned switching device in order to periodically increase the inductance of said transformer at the beginning of the opening periods of said first-mentioned switching device, and means for adjusting the phase position of said second switching device with respect to the phase position of said first switching device, said adjusting means being responsive to at least one characteristic electric value of said converting system.

19. A current or potential converting device for transferring energy between two electric circuits of different current or potential characteristics, comprising a mechanical switching device having an interrupter disposed in each phase connecting said two circuits and a synchronous motor for operating said interrupters in synchronism with the current to be interrupted, said motor having field windings disposed in different axes, a transformer having its primary windings series connected with said interrupters, means connected with the circuit of the secondary windings of said transformer for periodically varying the resistance of this circuit in synchronism with said switching device in order to increase the inductance of said transformer at the beginning of opening periods of said device, and means for varying the ratio of the currents in said field windings in response to fluctuations of a working value of said converting device.

20. A current or potential converting device for transferring energy between two electric circuits of different current or potential characteristics, comprising at least two interrupters, each of which being disposed in one of the phases connecting said two circuits, means for actuating said interrupters in synchronism with the current to be interrupted so as to open each interrupter near the zero value of said current, and a transformer arrangement having its primary windings series connected with said interrupters, a biasing circuit connected with the secondary windings of said transformer arrangement, said biasing circuit being designed to periodically increase and decrease its resistance so as to cause an increase of the inductance of each primary winding during a period beginning shortly before the opening moment of the interrupter connected to said primary winding.

21. A current or potential converting device for transferring energy between two electric circuits of different current or potential characteristics, comprising at least two interrupters, each of which being disposed in one of the phases connecting said two circuits, means for actuating said interrupters in synchronism with the current to be interrupted so as to open each interrupter near the zero value of said current, a transformer arrangement having its primary windings series connected with said interrupters, a biasing circuit connected with the secondary windings of said transformer arrangement, said biasing circuit being designed to periodically increase and decrease its resistance so as to cause an increase of the inductance of each primary winding during a period beginning shortly before the opening moment of the interrupter connected to said primary winding, said transformer arrangement having magnetic core members consisting of a ferromagnetic material of low coercive force and a high initial permeability of a curve having a sharp saturation bend.

22. A multiphase current or potential converting device for transferring energy between two electric circuits of different current or potential curves, comprising a mechanical commutating arrangement having a switching device disposed in each connecting phase between said two circuits, a set of single-phase transformers each having its primary winding series connected with one of said switching devices, a biasing circuit connected with the secondary winding of said transformer, a variable resistance arranged in said biasing circuit, and means for varying said resistance in synchronism with the current to be interrupted by said devices so as to increase the inductance of each primary winding at the time of the opening of said switching device.

ERWIN JANETSCHKE.